United States Patent
Chen et al.

(10) Patent No.: US 8,790,210 B2
(45) Date of Patent: Jul. 29, 2014

(54) POWER TOOL WITH AN AUTOMATIC SPEED REGULATING DEVICE

(75) Inventors: Liang Chen, Nanjing (CN); Zhi Zhang, Nanjing (CN); Jiang Li, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 288 days.

(21) Appl. No.: 13/303,321

(22) Filed: Nov. 23, 2011

(65) Prior Publication Data

US 2012/0142484 A1 Jun. 7, 2012

(30) Foreign Application Priority Data

Dec. 3, 2010 (CN) .......................... 2010 1 0590761

(51) Int. Cl.
*F16H 3/74* (2006.01)
*F16H 3/44* (2006.01)

(52) U.S. Cl.
USPC ............ 475/254; 475/257; 475/299; 475/300

(58) Field of Classification Search
USPC .......... 475/254, 257, 258, 262–264, 298–300
See application file for complete search history.

(56) References Cited

U.S. PATENT DOCUMENTS

| 3,741,313 | A * | 6/1973 | States | 173/176 |
| 6,546,815 | B2 * | 4/2003 | Yamada et al. | 73/862.21 |
| 7,882,900 | B2 * | 2/2011 | Borinato et al. | 173/176 |
| 7,900,715 | B2 * | 3/2011 | Chen | 173/183 |

* cited by examiner

*Primary Examiner* — Tisha Lewis
(74) *Attorney, Agent, or Firm* — Greenberg Traurig, LLP (57) ABSTRACT

A power tool is provided with a device for automatically switching transmission output, including at least one stage of transmission part having a sun gear, a planetary gear carrier, and a gear ring for transmission, a sensing system having a sensing component for sensing variation of operating condition, and a control device cooperated with the sensing system for controlling the transmission output of the transmission part. A first transmission output is generated when the sun gear, the planetary gear carrier, and the gear ring in the same stage are in a first transmission state, and a second transmission output is generated when the variation of operating condition received by the sensing component reaches a predetermined value and then being fed back to the control device by the sensing system.

16 Claims, 6 Drawing Sheets

POWER TOOL WITH AN AUTOMATIC SPEED REGULATING DEVICE

CROSS REFERENCE TO RELATED APPLICATION

This application is a non-provisional application claiming priority from Chinese Patent Application Serial No. CN 201010590761.9, filed Dec. 3, 2010, and incorporated herein by reference in its entirety.

FIELD OF THE DISCLOSURE

The present disclosure relates to a power tool, and more particular to a power tool with an automatic speed regulating device.

BACKGROUND OF RELATED ART

Generally, the required torque during the work implemented by a power tool, such as boring or screwing, will be periodically changed usually along with the differences of the working schedule and the processed material. For example, at the beginning of a working period, it usually needs low torque, while at the end of this period, it needs higher torque. In the prior art, the regulation of the speed regulating device is usually furnished by manual operation, which causes the operator to have to pay attention to the working state and the load changing condition of the tool all the times, and determine when the speed regulating device needs to be adjusted. Such manual operation requires the operator to possess the high level of the operation technique so that it is inconvenient to improve the efficiency

SUMMARY

The present disclosure provides a power tool, which has a transmission device to automatically switch the output. This transmission device can be automatically switched from a first transmission output to a second transmission output according to the inputted torque. Thus, the transmission device provides an output with high-speed and low-torque at the initial working period of the power tool, and provides an output with low-speed and high-torque at the end of this period of the power tool.

In order to achieve the above object, the following technical solution is utilized by the present disclosure:

A power tool with a device for automatically switching transmission output, comprising: at least one stage of transmission part having a sun gear, a planetary gear carrier and a gear ring for transmission; a sensing system having a sensing component for sensing variation of operating condition; and a control device cooperated with the sensing system for controlling the transmission output of the transmission part; wherein when the sun gear, the planetary gear carrier and the gear ring in the same stage of the transmission part are in a first transmission state, a first transmission output is generated by the transmission part; and when the variation of operating condition received by the sensing component reaches to a predetermined value and then being fed back to the control device by the sensing system, such that the sun gear, the planetary gear carrier and the gear ring in the same stage of the transmission part are in a second transmission state, a second transmission output is generated by the transmission part.

In the first transmission state, at least two of the sun gear, the planetary gear carrier or the gear ring in the same stage of the transmission part have the same transmission state; and in the second transmission state, at least two of the sun gear, the planetary gear carrier, or the gear ring in the same stage of the transmission part have the different transmission states.

It further comprises a connector for connecting at least two of the sun gear, the planetary gear carrier, and the gear ring, the connector can be moved between a first position where the first transmission output is generated and a second position where the second transmission output is generated.

The connector is provided with a connection portion which is slidable in an axial direction and connected with one of the sun gear, the planetary gear carrier or the gear ring.

The connector is configured as a protruding key or a slide groove.

The connector is further provided with a circumferential retainer which is connected with another of the sun gear, the planetary gear carrier or the gear ring.

The circumferential retainer is configured as a protruding tooth or a groove.

It further comprises a clutch device for locking the gear ring relative to a gearbox casing when the connector is in the second position.

The clutch device comprises a rolling member and a fixed bracket for receiving the rolling member, and the fixed bracket is arranged between the gear ring and the gearbox casing.

The sensing system is configured as an electric sensing system with circuit portion or a mechanical sensing system without any circuit portion.

The mechanical sensing system comprises a torsional force sensing system for sensing the torsional force of the exterior operating condition.

The sensing component is a gear ring on another stage of the transmission part for sensing the torsional force, which is distinct from the stage of the transmission part with the first and second transmission outputs.

The torsional force sensing system further comprises an annular member which has a cam member mated with a cam surface on the gear ring for sensing the torsional force, and an elastic member which exerts an acting force to the annular member so as to resist against the rotation of the gear ring for sensing the torsional force.

It further comprises a restoring device for driving the connector to move between the first position and the second position.

The restoring device comprises a pivotable wire bracket and an elastic member acting on the wire bracket, and the wire bracket is connected with the connector to bias the connector toward the second position under the action of the elastic member.

The same transmission state is a conjunct rotation state or a stopped state with the same rotating speed.

The variation of operating condition comprises any one or any combination of variation of torsional force, electric current, speed, voltage, and power.

By using the automatic speed regulating transmission device disclosed by the present disclosure, the power tool can sense the operating torsional force, and automatically adjust the rotational speed from high-speed to low-speed according to the sensed exterior torsional force without manually resetting by the operator. By utilizing the clutch device, it can stably perform a switch for the speed without any impact during the operation. The arrangement with at least two kinds of the speed outputs can be implemented in the same stage of the transmission part, such that the size of the entire tool is smaller and the structure thereof is more compact.

BRIEF DESCRIPTION OF THE DRAWINGS

FIG. 4 is a schematic view illustrating the first transmission part being in different output states at different speeds, wherein FIG. 4a is a view illustrating the first transmission part being in an output state at high-speed, FIG. 4b is a sectional view of FIG. 4a taken along the line A-A, FIG. 4c is a view illustrating the first transmission part being in an output state at low-speed, and FIG. 4d is a sectional view of FIG. 4c taken along the line A-A;

FIG. 6 is a schematic view illustrating a sensing system for torsional force on the second transmission part, wherein FIG. 6a is a front view and FIG. 6b is a side view;

DETAILED DESCRIPTION

Figure 1:
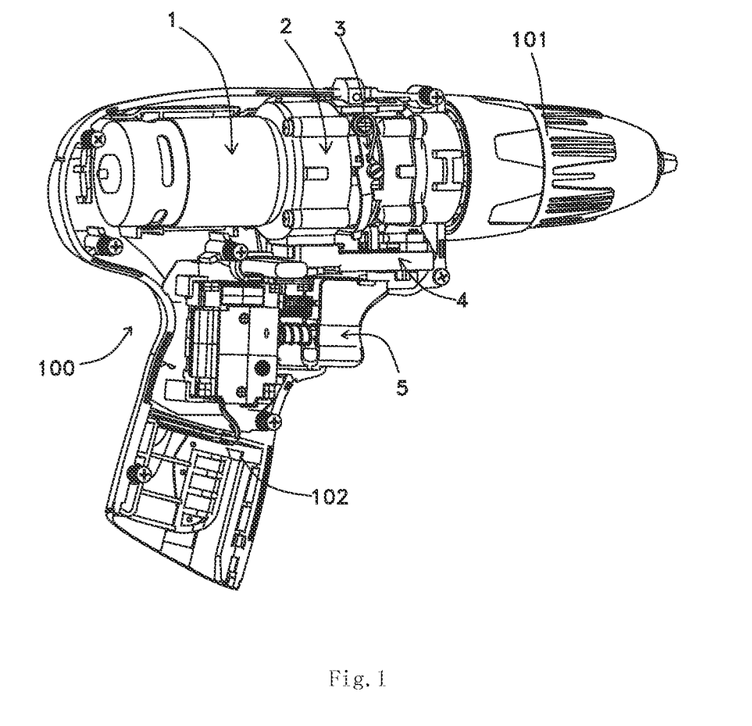
FIG. 1 is a structural schematic view illustrating an electric drill according to a preferred embodiment of the present invention.

A preferred embodiment of the present invention is shown in FIG. 1, which takes an electric drill with an automatic speed regulating device as an example.

The electric drill comprises a main body 100, a chuck portion 101, and a gripping portion 102. The main body 100 is provided with a trigger switch 5 and a control mechanism 4 that can be interconnected by the trigger switch 5. The main body 100 accommodates a motor 1, a reduction gearbox 2 and an elastic restoring device 3 that can be interconnected by the control mechanism 4 therein.

Figure 2:
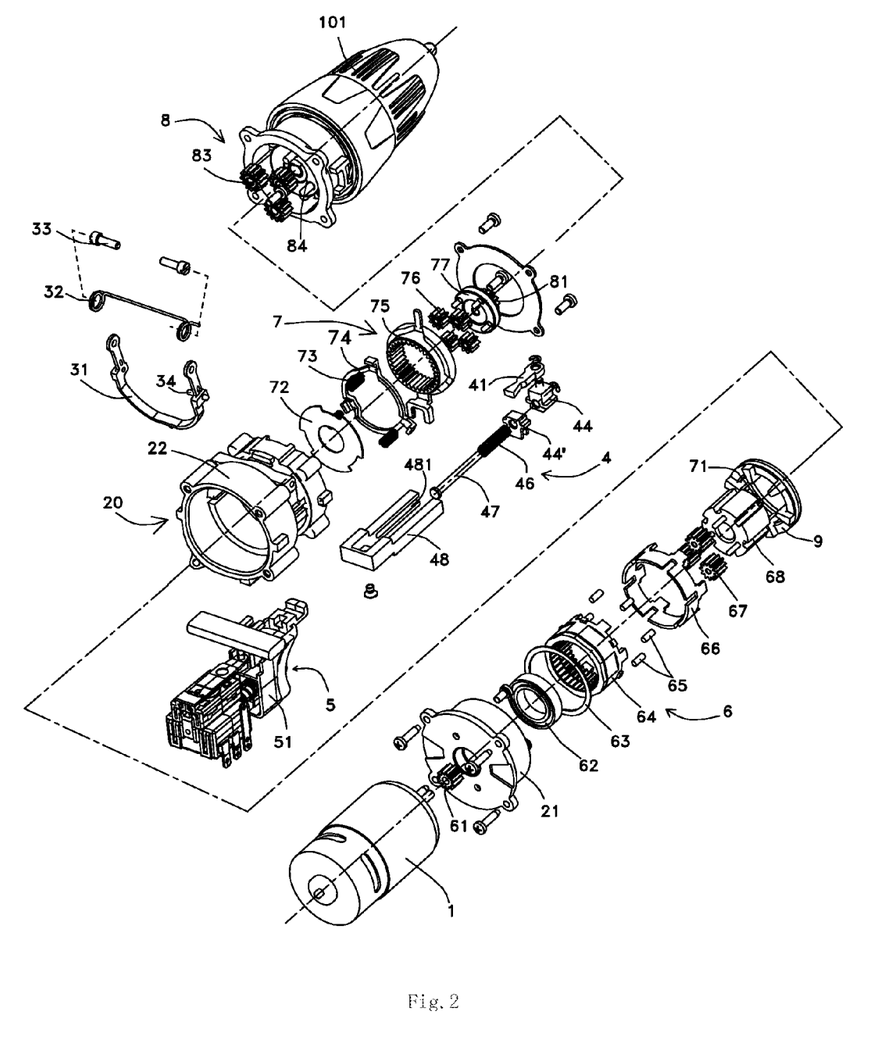
FIG. 2 is an exploded view illustrating the components of a transmission device of the electric drill according to the preferred embodiment of the present invention.

As shown in FIG. 2, it is an exploded view of the components of a transmission device according to the present invention. The transmission device can be automatically switched from an output state with high-speed and low-torque to another output state with low-speed and high-torque according to the condition of the exterior torsional force. The transmission device comprises a gearbox casing 20 that is composed of a first casing 21 and a second casing 22, and the first casing 21 is fixedly connected to the second casing 22 by known means such as a bolt. A first stage transmission part 6, a second stage transmission part 7, and a third stage transmission part 8 are arranged within the gearbox casing 20. Wherein the first stage transmission part 6 has a first sun gear 61, a first planetary gear set 67, a first planetary gear carrier 68 and a first gear ring 64. The second stage transmission part 7 has a second sun gear 71, a second planetary gear set 76, a second planetary gear carrier 77 and a second gear ring 75. The third stage transmission part 8 has a third sun gear 81, a third planetary gear set 83 and a third planetary gear carrier 84.

Figure 3:
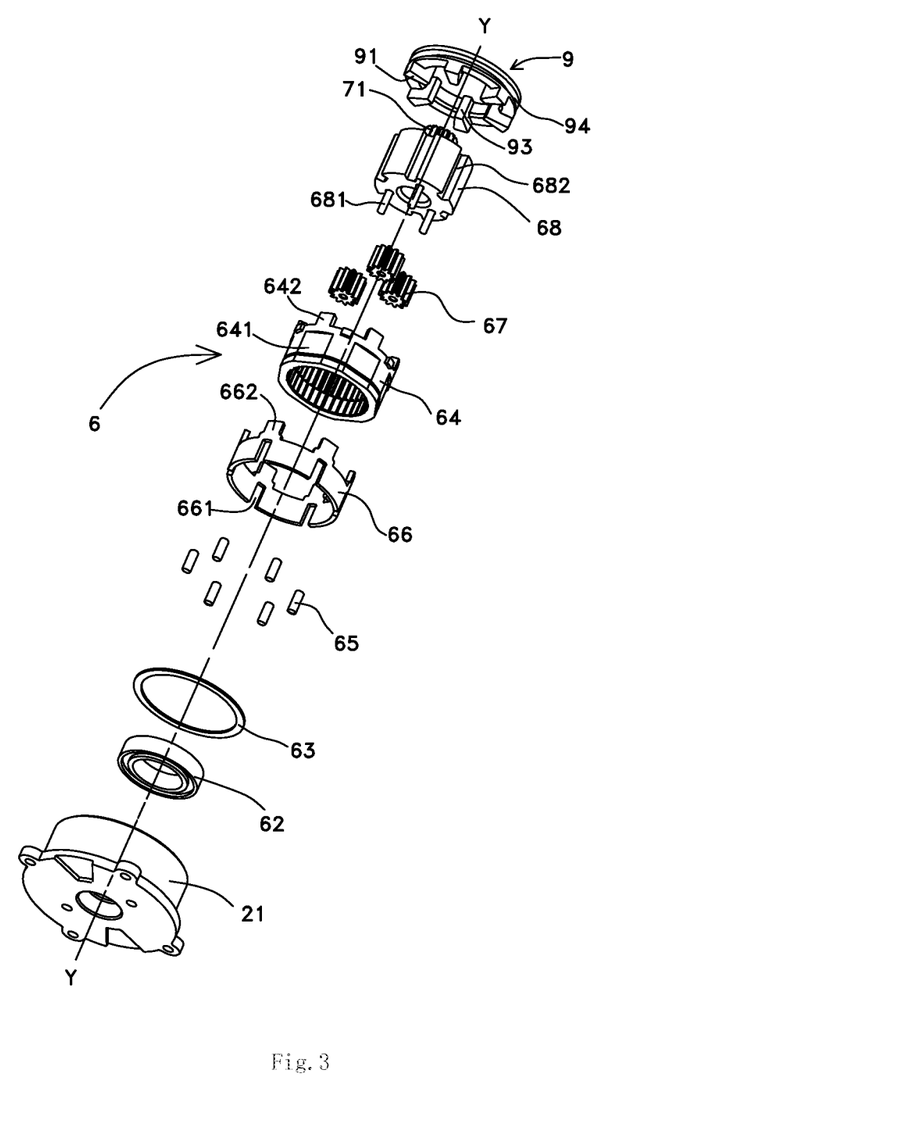
FIG. 3 is an exploded view illustrating the components of a first transmission part of the transmission device according to the present invention.

As shown in FIG. 3, it is an exploded view illustrating the components of the first stage transmission part 6. A bearing 62 and a retainer ring 63 are arranged on one side of the first stage transmission part 6. A fixed bracket 66 is sleeved on the first gear ring 64 and provided with grooves 661 thereon in which pin rollers 65 can be received, and the first gear ring 64 is provided with flat planes 641 on the periphery thereof, and the positions of the grooves 661 correspond with that of the flat planes 641, respectively. Protruding teeth 642 are arranged on the end surface of the first gear ring 64, and protruding teeth 662 which may overlap the protruding teeth 642 are arranged on the end surface of the fixed bracket 66. A column set 681 for fixing the first planetary gear set 67 is arranged on one side end surface of the first planetary gear carrier 68. The second sun gear 71 is fixedly integrated with another side end surface of the first planetary gear carrier. Grooves 682 are arranged on the periphery of the first planetary gear carrier 68 in an axial direction Y. An annular connector 9 is sleeved on the first planetary gear carrier 68 and provided with inner teeth 93 which may slidably fit with the axial grooves 682 and end teeth 91 which may circumferentially stopping fit with the protruding teeth 642 and 662. The inner teeth 93 may be integrated with the end teeth 91.

Figure 4:
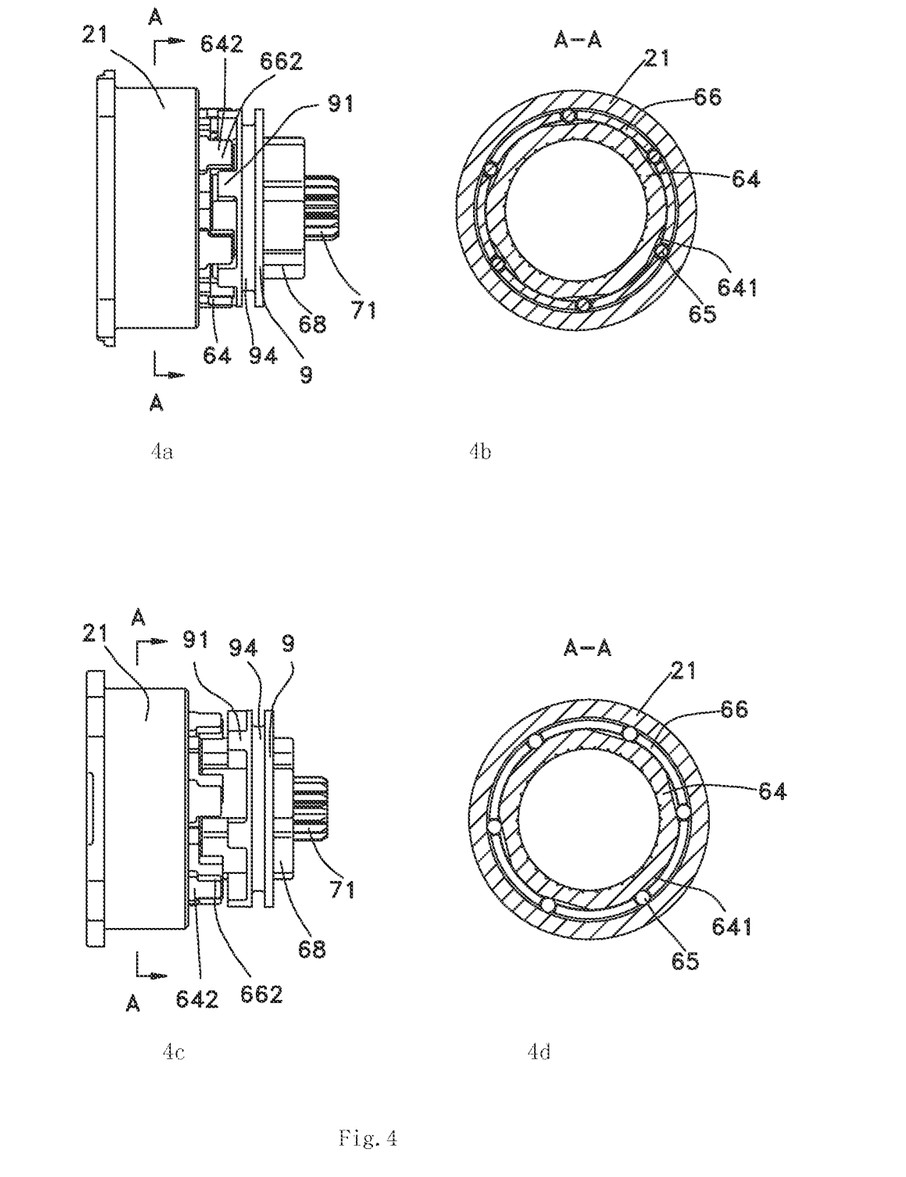

As shown in FIG. 4, it is a schematic view illustrating the first stage transmission part 6 being in different states with different transmission outputs, wherein FIGS. 4a and 4b are views illustrating the first stage transmission part 6 being in a state of high-speed output. In this state, the connector 9 is in a first position where the end teeth 91 of the connector 9 abut against the protruding teeth 642 of the first gear ring 64 such that the connector 9 can not be circumferentially rotated with respect to the first gear ring 64. At the same time, the inner teeth 93 of the connector 9 are mated with the axial grooves 682 of the first planetary gear carrier 68 such that the connector 9 can not be circumferentially rotated with respect to the first planetary gear carrier 68. Thus, the first planetary gear carrier 68 and the first gear ring 64 can be integrally rotated. Additionally, the end teeth 91 of the connector 9 also abut against the protruding teeth 662 on the fixed bracket 66 such that the pin rollers 65 received in the grooves 661 of the fixed bracket 66 just locate in the middle position of the flat planes 641, respectively. The first gear ring 68 is in an unlocked state and can be rotated with respect to the gearbox casing 20. At this time, the first stage transmission part 6 does not be operated to reduce the speed, so that the output of the entire transmission device is a two-stage reducer.

FIGS. 4c and 4d are views illustrating the first stage transmission part 6 being in a state of low-speed output. In this state, the connector 9 is in a second position where the connector 9 moves along the axial direction Y with respect to the first planetary gear carrier 68 to a state that the end teeth 91 thereof disengage from the protruding teeth 642 of the first gear ring 64. Thus the first planetary gear carrier 68 can be rotated independently relative to the first gear ring 64. Moreover, after being disengaged from the constraint of the circumferential stopping of the connector 9, the first gear ring 64 is rotated reversely with respect to the rotary output of the first planetary carrier 68. When the first gear ring is rotated to a position where one side end of the flat plane 641 of the first gear ring is pressed tightly by the pin roller 65, the first gear ring 64 is locked and can not be circumferentially rotated with respect to the gearbox casing 20. At this time, the first stage transmission part 6 takes part in deceleration. Accordingly, the output of the entire transmission device is a three-stage reducer.

Figure 5:
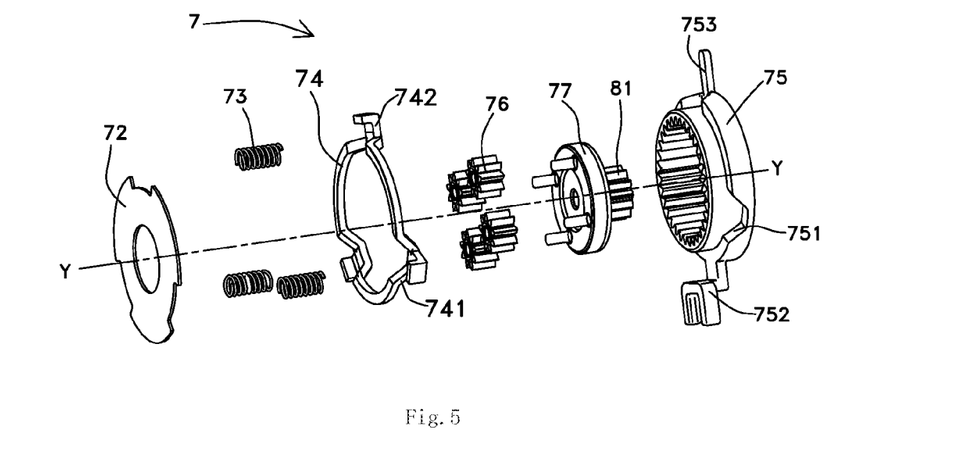
FIG. 5 is an exploded view illustrating the components of a second transmission part of the transmission device according to the present invention.
Figure 6:
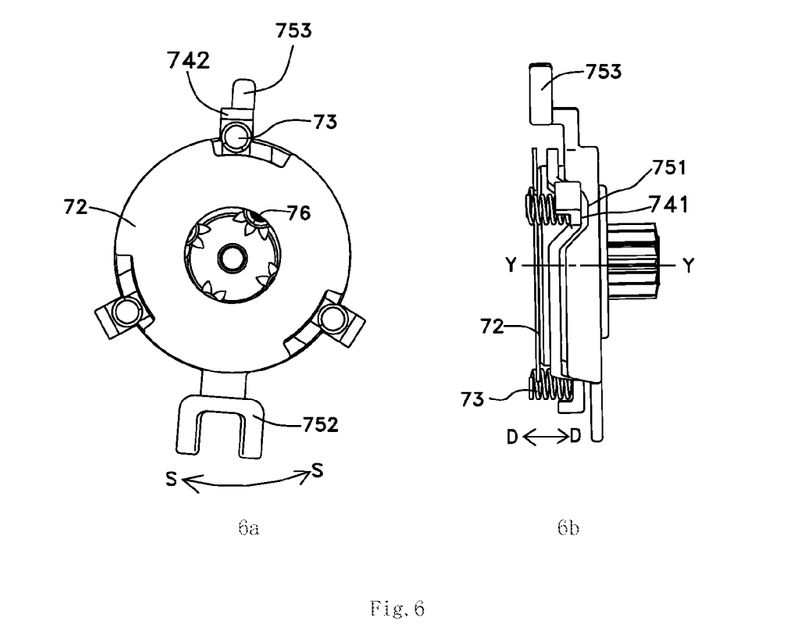

The power tool of the present preferred embodiment further comprises a torsional force sensing system. As shown in FIG. 5, the torsional force sensing system is arranged on the second stage transmission part 7. Wherein the second gear ring 75 is used for receiving the exterior torsional force and can be rotated with respect to the gearbox casing 20 along with the increased exterior torsional force. An arm 753 is provided on the second gear ring 75 and can pass through the gearbox casing 20 for indicating and limiting the rotational angle of the second gear ring 75 relative to the gearbox casing 20. The torsional force sensing system also comprises springs 73 and an annular member 74 which is unrotatably connected to the gearbox casing 20 via claws 742 thereon. The springs 73 press against the annular member 74 such that the annular member 74 tightly abuts against the second gear ring 75. The second gear ring 75 and the annular member 74 are provided with cam surfaces 751 and cam members 741 respectively, which can be engaged with each other. Both of the cam surfaces 751 and the cam members 741 are substantially V-shaped. Referring to FIG. 6, when the second gear ring is rotated to an angle along the direction indicated by the arrow S, the cam surfaces 751 press against the cam members 741 so as to drive the annular member 74 to overcome the elastic force of the springs 73 and then move a distance along the direction indicated by the arrow D.

A retainer 72 is arranged on the side end of the second planetary gear set 76 such that the second planetary gear set 76 is positioned in the axial direction Y. The second gear ring 75 is also provided with a shifting fork 752 for guiding a control member 41 to move.

The electric drill in the preferred embodiment of the present invention also comprises an elastic restoring device 3 and a control mechanism 4. Referring to FIG. 2, the elastic restoring device 3 comprises a wire bracket 31 and a torsional spring 32, the wire bracket 31 is arranged around the outside of the gearbox 2 and provided with a pin 34 passing through the gearbox casing 20, and the torsional spring 32 may bias the wire bracket 31 to make it rotate to a restoring position around a pivot 33. The pin 34 may be fitted into a circumferential groove 94 of the connector 9 so that the wire bracket 31 may drive the connector 9 to move between the first position and the second position when the wire bracket 31 swings back and forth. The control mechanism 4 comprises a mounting base 48 and a supporting rod 47 arranged in the mounting base 48. A biasing spring 46 is sleeved on the supporting rod 47 and the supporting rod 47 is connected with slide blocks 44 and 44'. The slide blocks 44 and 44' are guided by a slide groove 481 on the mounting base 48 and the slide block 44 is connected with a control rod 41. The trigger switch 5 and the biasing spring 46 may cooperate with each other to drive the slide blocks 44, 44' and the control rod 41 to move in the direction parallel to the axial direction Y.

Figure 7:
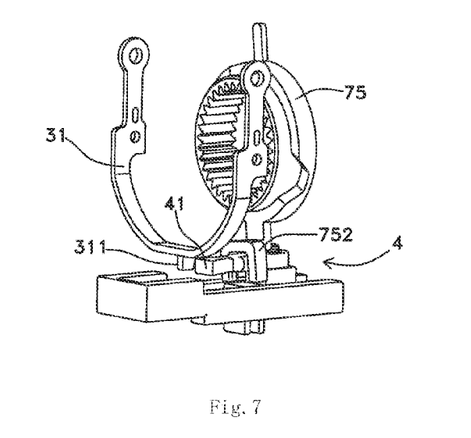
FIG. 7 is a schematic view illustrating a state in which a control device, an elastic restoring device and the sensing system of the electric drill according to the preferred embodiment of the present invention are mutually coordinated.
Figure 8:
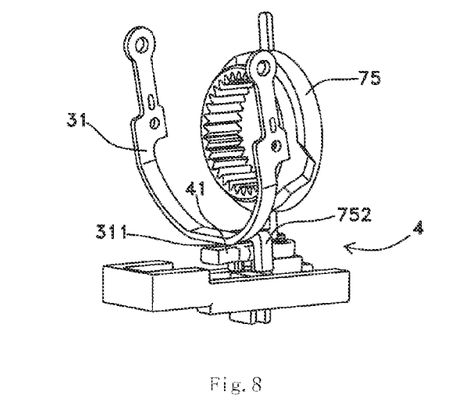
FIG. 8 is a schematic view illustrating another state of the mutually coordinated control device, the elastic restoring device and the sensing system of the electric drill according to the preferred embodiment of the present invention.

Referring to FIGS. 7 and 8, the switching process of the transmission device of the power tool from the output with high-speed and low-torque to the output with low-speed and high-torque according to the present invention will be explained. A connection portion 311 is formed on the wire bracket 31 and can mate with the control rod 41. First, the trigger switch 5 is triggered to drive the control rod 41 to abut against the connection portion 311, and then the wire bracket 31 is pushed backward so as to drive the connector 9 to be in the first position. Next, a switch 51 of the motor is started and the output with high-speed and low-torque is generated accordingly. As the exterior torsional force is increased, when the torsional force received by the second gear ring 75 is increased to a predetermined value of the torsional force, the shifting fork 752 arranged on the second gear ring 75 shifts the control rod 41 away from the connection portion 311, then the wire bracket 31 is released and may swing backward under the action of the torsional spring 32, so that the connector 9 is driven to be in the second position, and the output with low-speed and high-torque is generated accordingly.

Figure 9:
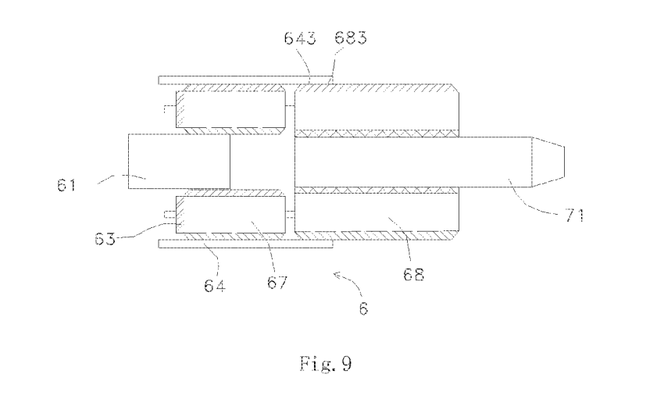
FIG. 9 is a schematic view illustrating another embodiment in which a switchable output can be realized by the same stage transmission part.

According to the present invention, at least two kinds of the speed outputs may be implemented in the same stage planetary gear system of the transmission device, such that the entire structure of the power tool is more compact. In the present preferred embodiment, the transmission part for switching the output is arranged on the first stage transmission part connected with the shaft of the motor. In other embodiments, the transmission part for switching the output also can be arranged on the second or the third stage transmission part. In the present preferred embodiment, by making the gear ring and the planetary gear carrier of the first stage transmission part as a whole, it can be switched between a first transmission output with conjunct rotation and a second transmission output with relatively independent rotation. In other embodiments, for switching the speed in the same stage transmission part, it also can have at least following manners: 1) when the transmission ratio is 1, the sun gear and the planetary gear carrier may be fixed together so as to rotate or stop jointly, or the sun gear and the gear ring may be fixed together so as to rotate or stop conjunctly, or the planetary gear carrier and the gear ring may be fixed together so as to rotate or stop conjunctly, or the sun gear, the planetary gear carrier and the gear ring may be fixed together so as to rotate jointly; 2) when the transmission ratio is less than 1, the sun gear, the planetary gear carrier and the gear ring may oppositely rotate with respect to each other, respectively. In the present preferred embodiment, the gear ring and the planetary gear carrier are fixed together or disengaged from each other by the connector, while in other embodiments the connector also can be omitted. As shown in FIG. 9, one of the gear ring 64 and the planetary gear carrier 68 is configured as a member which is slidable in the axial direction, the outer cylindrical surface of the plate-shaped main body of the planetary gear carrier 68 is also provided with the teeth 683 that can be mated with the teeth 643 on the gear ring. When the teeth 643 and the teeth 683 are engaged with each other, the gear ring 64 and the planetary gear carrier 68 are fixed as a whole so as to rotate together, and the transmission part has a first transmission output accordingly. When the teeth 643 are disengaged from the teeth 683, the planetary gear carrier 68 independently rotates relative to the gear ring 64, and the transmission part has a second transmission output accordingly.

According to the power tool of the present invention, the speed switch system thereof also can have a switch mode of high-low-high. When the torsional force of the exterior operating condition is less than the setting value of the tool for switching the torsional force, the tool is in the state of high speed and low torsional force, and when the torsional force of the exterior operating condition is greater than or equal to the setting value of the tool for switching the torsional force, the tool is in the state of low speed and high torsional force. During the operation of the tool, the above two kinds of the operation conditions can be automatically switched according to the change of the exterior torsional force.

According to the present invention, the power tool also can have an integration mode with a manual mode and an automatic mode. In the manual mode, the high-speed or the low-speed can be set by the user manually, and in the automatic mode, the mode can be set in the automatic position by the user and thus the high-speed or the low-speed is automatically set by the tool according to the exterior operating condition.

According to the present invention, the sensing system also can be configured as a mechanical sensing system, for example, utilizing the structure of the centrifugal clutch for sensing speed, and also can be configured as an electric sensing system for sensing the displace, the torsional force, the speed and so on of the tool or sensing the electric current, the power and the like of the tool by an electric sensor.

In the present invention, the control manner for switching the output is not limited to the present preferred embodiment, but also can be finished with the aid of other structures or devices, such as a motor manner controlled by small motor, an electromagnetic manner, a pneumatic manner, a hydraumatic manner and so on.

The transmission device of the power tool disclosed in the present invention can be applied to power tools such as AC or DC electric drill or power screw driver, etc. The transmission device of the power tool disclosed in the present invention is not limited to the contents of the above embodiments and the structures represented by the accompanying drawings. All obvious alternations, replacements, or modifications to configurations and positions of the components therein based on the present invention are regarded as falling within the protection scope of the present invention.

We claim:

1. A power tool with a device for automatically switching transmission output, comprising:
    at least one stage of transmission part having a sun gear, a planetary gear carrier, and a gear ring for transmission;
    a sensing system having a sensing component for sensing variation of operating condition; and
    a control device cooperated with the sensing system for controlling the transmission output of the transmission part;
    wherein when the sun gear, the planetary gear carrier and the gear ring in the same stage of the transmission part are in a first transmission state, a first transmission output is generated by the transmission part; and
    when the variation of operating condition received by the sensing component reaches to a predetermined value and then being fed back to the control device by the sensing system, such that the sun gear, the planetary gear carrier and the gear ring in the same stage of the transmission part are in a second transmission state, a second transmission output is generated by the transmission part,
    wherein in the first transmission state, at least two of the sun gear, the planetary gear carrier, or the gear ring in the same stage of the transmission part have the same transmission state; and
    in the second transmission state, at least two of the sun gear, the planetary gear carrier, or the gear ring in the same stage of the transmission part have the different transmission states.

2. The power tool according to claim 1, wherein the same transmission state is a conjunct rotation state or a stopped state with the same rotating speed.

3. The power tool according to claim 1, further comprising a connector for connecting at least two of the sun gear, the planetary gear carrier, or the gear ring, the connector can be moved between a first position where the first transmission output is generated and a second position where the second transmission output is generated.

4. The power tool according to claim 3, wherein the connector comprises a connection portion which is slidable in an axial direction and connected with one of the sun gear, the planetary gear carrier, or the gear ring.

5. The power tool according to claim 3, wherein the connector is configured as a protruding key or a slide groove.

6. The power tool according to claim 4, wherein the connector comprises a circumferential retainer which is connected with another of the sun gear, the planetary gear carrier, and the gear ring.

7. The power tool according to claim 6, wherein the circumferential retainer is configured as a protruding tooth or a groove.

8. The power tool according to claim 3, further comprising a clutch device for locking the gear ring relative to a gearbox casing when the connector is in the second position.

9. The power tool according to claim 8, wherein the clutch device comprises a rolling member and a fixed bracket for receiving the rolling member, and the fixed bracket is arranged between the gear ring and the gearbox casing.

10. The power tool according to claim 3, wherein it further comprises a restoring device for driving the connector to move between the first position and the second position.

11. The power tool according to claim 10, wherein the restoring device comprises a pivotable wire bracket and an elastic member acting on the wire bracket, and the wire bracket is connected with the connector to bias the connector toward the second position under the action of the elastic member.

12. The power tool according to claim 1, wherein the sensing system is configured as an electric sensing system with circuit portion or a mechanical sensing system without any circuit portion.

13. The power tool according to claim 12, wherein the mechanical sensing system comprises a torsional force sensing system for sensing the torsional force of the exterior operating condition.

14. The power tool according to claim 13, wherein the sensing component is a gear ring on another stage of the transmission part for sensing the torsional force, which is distinct from the stage of the transmission part with the first and second transmission outputs.

15. The power tool according to claim 13, wherein the torsional force sensing system further comprises: an annular member which has a cam member mated with a cam surface on the gear ring for sensing the torsional force, and an elastic member which exerts an acting force to the annular member so as to resist against the rotation of the gear ring for sensing the torsional force.

16. The power tool according to claim 1, wherein the variation of operating condition comprises any one or any combination of variation of torsional force, electric current, speed, voltage, or power.

* * * * *